(12) United States Patent
Felton et al.

(10) Patent No.: US 9,269,418 B2
(45) Date of Patent: Feb. 23, 2016

(54) APPARATUS AND METHOD FOR CONTROLLING REFRESHING OF DATA IN A DRAM

(75) Inventors: Donald Felton, Cambridge (GB); Emre Özer, Cambridge (GB); Sachin Satish Idgunji, San Jose, CA (US)

(73) Assignee: ARM Limited, Cambridge (GB)

( * ) Notice: Subject to any disclaimer, the term of this patent is extended or adjusted under 35 U.S.C. 154(b) by 251 days.

(21) Appl. No.: 13/366,660

(22) Filed: Feb. 6, 2012

(65) Prior Publication Data

US 2013/0205080 A1    Aug. 8, 2013

(51) Int. Cl.

| | |
|---|---|
| G06F 12/14 | (2006.01) |
| G11C 11/406 | (2006.01) |
| G06F 21/75 | (2013.01) |
| G06F 21/79 | (2013.01) |
| G11C 11/408 | (2006.01) |

(52) U.S. Cl.
CPC .......... *G11C 11/40622* (2013.01); *G06F 21/75* (2013.01); *G06F 21/79* (2013.01); *G11C 11/408* (2013.01); *G11C 2211/4065* (2013.01)

(58) Field of Classification Search
USPC ........................................................ 711/106
See application file for complete search history.

(56) References Cited

U.S. PATENT DOCUMENTS

| | | | | |
|---|---|---|---|---|
| 5,276,738 | A * | 1/1994 | Hirsch ............................. | 380/46 |
| 7,042,785 | B2 * | 5/2006 | Kim ............................... | 365/222 |
| 2004/0028234 | A1 | 2/2004 | Wuidart | |
| 2005/0008036 | A1 * | 1/2005 | Hsu et al. ....................... | 370/474 |
| 2005/0286309 | A1 | 12/2005 | Kang et al. | |
| 2008/0016583 | A1 | 1/2008 | Giraud et al. | |
| 2008/0022055 | A1 * | 1/2008 | Kanai ............................. | 711/154 |
| 2008/0152142 | A1 * | 6/2008 | Buer et al. ..................... | 380/270 |
| 2008/0301467 | A1 * | 12/2008 | Saito .............................. | 713/190 |

(Continued)

FOREIGN PATENT DOCUMENTS

| | | |
|---|---|---|
| EP | 0 199 128 | 10/1986 |
| EP | 1 587 237 | 10/2005 |

(Continued)

OTHER PUBLICATIONS

Nak Hee Seong, Dong Hyuk Woo, and Hsien-Hsin S. Lee. 2010. Security refresh: prevent malicious wear-out and increase durability for phase-change memory with dynamically randomized address mapping. In Proceedings of the 37th annual international symposium on Computer architecture (ISCA '10). ACM, New York, NY, USA, 383-394. DOI=10.1145/1815961.18160.*

(Continued)

*Primary Examiner* — Reginald Bragdon
*Assistant Examiner* — Leandro Villanueva
(74) *Attorney, Agent, or Firm* — Nixon & Vanderhye P.C.

(57) ABSTRACT

An apparatus comprises a dynamic random-access memory (DRAM) for storing data. Refresh control circuitry is provided to control the DRAM to periodically perform a refresh cycle for refreshing the data stored in each memory location of the DRAM. A refresh address sequence generator generates a refresh address sequence of addresses identifying the order in which memory locations of the DRAM are refreshed during the refresh cycle. To deter differential power analysis attacks on secure data stored in the DRAM, the refresh address sequence is generated with the addresses of at least a portion of the memory locations in a random order which varies from refresh cycle to refresh cycle.

20 Claims, 7 Drawing Sheets

(56) References Cited

U.S. PATENT DOCUMENTS

| | | |
|---|---|---|
| 2009/0043969 A1 | 2/2009 | Yoon et al. |
| 2009/0113217 A1* | 4/2009 | Dolgunov et al. ............ 713/190 |
| 2009/0323956 A1* | 12/2009 | Tsunoo et al. ................ 380/268 |
| 2011/0107005 A1* | 5/2011 | Nakaoka ............................ 711/5 |
| 2012/0144106 A1* | 6/2012 | Bains ........................... 711/106 |

FOREIGN PATENT DOCUMENTS

| | | |
|---|---|---|
| GB | 2 438 972 | 12/2007 |
| KR | 10-0759257 | 9/2007 |

OTHER PUBLICATIONS

"Memory 1997". Integrated Circuit Engineering. 1997, http://smithsonianchips.si.edu/ice/cd/MEMORY97/SEC07.PDF.*

UK Search Report dated Jul. 26, 2012 in GB 1203490.6.

Jung-Sik Kim et al., "A 1.2V 12.8GB/s 2Gb Mobile Wide-I/O DRAM with 4x128 I/Os Using TSV-Based Stacking", 2011 IEEE International Solid-State Circuits Conference (ISSCC 2011), Feb. 23, 2011, 3 pages.

P. Kocher et al., "Introduction to Differential Power Analysis", Journal of Cryptographic Engineering, J Cryptogr Eng (2011)1:5-27, published online Mar. 3, 2011, pp. 5-27.

R. Kalla et al., "IBM POWER7: IBM's Next Generation Balanced Power Server Chip", HotChips-21, 2009. (http://www.hotchips.org/archives/hc21/3_tues/HC21.25.800.ServerSystemsII-Epub/HC21.25.829.Kalla-IBM-POWER7NextGenerationServerProcessory7display.pdf), Aug. 23-25, 2009, 12 pages.

Nak He Seong et al., "Security Refresh: Prevent Malicious Wear-out and Increase Durability for Phase-Change Memory with Dynamically Randomized Address Mapping", Proceedings of the 37$^{th}$ Annual International Symposium on Computer Architecture, Jun. 19-23, 2010, 12 pages.

J. Valamehr et al., "A Qualitative Security Analysis of a New Class of 3-D Integrated Crypto Co-processors", Springer LNCS vol. 6805, Jun. 2011, 12 pages.

* cited by examiner

| | sequential address sequence | XOR with 1011 → | refresh address sequence | |
|---|---|---|---|---|
| 0 | 0000 | | 1011 | 11 |
| 1 | 0001 | | 1010 | 10 |
| 2 | 0010 | | 1001 | 9 |
| 3 | 0011 | | 1000 | 8 |
| 4 | 0100 | | 1111 | 15 |
| 5 | 0101 | | 1110 | 14 |
| 6 | 0110 | | 1101 | 13 |
| 7 | 0111 | | 1100 | 12 |
| 8 | 1000 | | 0011 | 3 |
| 9 | 1001 | | 0010 | 2 |
| 10 | 1010 | | 0001 | 1 |
| 11 | 1011 | | 0000 | 0 |
| 12 | 1100 | | 0111 | 7 |
| 13 | 1101 | | 0110 | 6 |
| 14 | 1110 | | 0101 | 5 |
| 15 | 1111 | | 0100 | 4 |

FIG. 2

| | sequential address sequence | XOR with 1011 → | right rotate by 3 bits → | refresh address sequence | |
|---|---|---|---|---|---|
| 0 | 0000 | 1011 | | 0111 | 7 |
| 1 | 0001 | 1010 | | 0101 | 5 |
| 2 | 0010 | 1001 | | 0011 | 3 |
| 3 | 0011 | 1000 | | 0001 | 1 |
| 4 | 0100 | 1111 | | 1111 | 15 |
| 5 | 0101 | 1110 | | 1101 | 13 |
| 6 | 0110 | 1101 | | 1011 | 11 |
| 7 | 0111 | 1100 | | 1001 | 9 |
| 8 | 1000 | 0011 | | 0110 | 6 |
| 9 | 1001 | 0010 | | 0100 | 4 |
| 10 | 1010 | 0001 | | 0010 | 2 |
| 11 | 1011 | 0000 | | 0000 | 0 |
| 12 | 1100 | 0111 | | 1110 | 14 |
| 13 | 1101 | 0110 | | 1100 | 12 |
| 14 | 1110 | 0101 | | 1010 | 10 |
| 15 | 1111 | 0100 | | 1000 | 8 |

FIG. 3 refresh address sequence

| Rand no. | matrix input A | | | |
|---|---|---|---|---|
| | A(3) | A(2) | A(1) | A(0) |
| | mapped to matrix output M: | | | |
| 0 | 3 | 2 | 1 | 0 |
| 1 | 3 | 2 | 0 | 1 |
| 2 | 3 | 1 | 2 | 0 |
| 3 | 3 | 0 | 2 | 1 |
| 4 | 3 | 1 | 0 | 2 |
| 5 | 3 | 0 | 1 | 2 |
| 6 | 2 | 3 | 1 | 0 |
| 7 | 2 | 3 | 0 | 1 |
| 8 | 1 | 3 | 2 | 0 |
| 9 | 0 | 3 | 2 | 1 |
| 10 | 1 | 3 | 0 | 2 |
| 11 | 0 | 3 | 1 | 2 |
| 12 | 1 | 2 | 3 | 0 |
| 13 | 0 | 2 | 3 | 1 |
| 14 | 2 | 1 | 3 | 0 |
| 15 | 2 | 0 | 3 | 1 |
| 16 | 0 | 1 | 3 | 2 |
| 17 | 1 | 0 | 3 | 2 |
| 18 | 0 | 2 | 1 | 3 |
| 19 | 1 | 2 | 0 | 3 |
| 20 | 0 | 1 | 2 | 3 |
| 21 | 1 | 0 | 2 | 3 |
| 22 | 2 | 1 | 0 | 3 |
| 23 | 2 | 0 | 1 | 3 |

APPARATUS AND METHOD FOR CONTROLLING REFRESHING OF DATA IN A DRAM

FIELD OF THE INVENTION

The present invention relates to the field of dynamic random access memory (DRAM). More particularly, the invention relates to a technique for controlling refreshing of the data in the DRAM.

BACKGROUND TO THE INVENTION

Dynamic random access memory (DRAM) is a type of memory in which the data stored in the memory must periodically be refreshed to avoid loss of the data. A common form of DRAM stores data using capacitors. The capacitor may be placed in either a discharged state or a charged state to represent bit values of zero or one. Since capacitors leak charge over time, the data stored using capacitors will fade unless the capacitor is refreshed periodically.

In the present application, the terms "dynamic random access memory" and "DRAM" are used to refer to any kind of memory which requires its data to be refreshed periodically to avoid loss of the data (whether the data is stored using capacitors or using another kind of storage element).

DRAM is increasingly being used for storage of secure data and secure program code. This is particularly the case in systems in which the DRAM is integrated into the same system-on-chip or package as the processing logic associated with the DRAM. For example, 3D-integrated DRAMs may be used in a system-on-chip having multiple stacked layers. By isolating the DRAM from the external world, it is more difficult for an attacker to probe the interface between the DRAM and the processing logic and so data may be held more securely in the DRAM.

The present technique seeks to improve the security of secure data stored in a DRAM.

SUMMARY OF INVENTION

Viewed from one aspect, the present invention provides an apparatus comprising:

a dynamic random-access memory (DRAM) for storing data;

refresh control circuitry configured to control said DRAM to periodically perform a refresh cycle for refreshing the data stored in each memory location of said DRAM; and a refresh address sequence generator configured to generate a refresh address sequence of addresses identifying the order in which memory locations of said DRAM are refreshed during said refresh cycle;

wherein said refresh address sequence generator is configured to generate said refresh address sequence with the addresses of at least a portion of said memory locations in a random order which varies from refresh cycle to refresh cycle.

The present technique recognises that the contents of a DRAM can be vulnerable to security attacks such as differential power analysis (DPA). DPA is a powerful attack that uses observation of the power consumption of a circuit to at least partially deduce secret information. For example, DPA has been used to extract secret keys from crypto engines. To perform DPA, the attacker probes the power supply pin or ground supply pin of a circuit and observes the power consumption of the circuit over a period of time. Since the power consumption will vary slightly depending on the data values being processed, statistical methods can be used to crack the secret information without requiring any knowledge of the algorithm being performed by the circuit. Even if the secret information cannot be fully determined using DPA, DPA may be used to deduce partial information (such as whether a value contains bit values which are mostly 0 or mostly 1), which allows some potential values of the secret information to be eliminated, increasing the likelihood of success of a brute force attack which attempts each possible value of the secret information to try to crack the actual value of the information. Therefore, DPA could be used to analyse the secure contents of the DRAM.

The present technique recognises that the refresh operation of a DRAM provides a security vulnerability which a differential power analysis attacker could exploit. Since the refresh operation is periodic, the DPA attacker can relatively easily work out which parts of the power consumption profile correspond to the refresh operation, by looking for a repeating pattern in the power consumption. Also, since the memory locations of a DRAM is typically refreshed in a predictable sequence, a DPA attacker can easily attribute the power consumed at different times during the refresh cycle to individual DRAM memory locations, to obtain information about the contents of the DRAM.

To address this problem, the present technique provides a refresh address sequence generator which generates a refresh address sequence in which the addresses of at least a portion of the memory locations of the DRAM are in a random order which varies from refresh cycle to refresh cycle. This ensures that the order in which the DRAM locations are refreshed is not predictable, and so it is difficult for a DPA attacker to map the power consumed at a particular instant during the refresh cycle to any individual memory location of the DRAM. This improves the security of the data stored within the DRAM.

In one example, the refresh address sequence generated by the refresh address sequence generator may comprise a sequence of addresses identifying individual memory locations within the DRAM.

However, it is more common for DRAM refresh to be performed in units of rows of memory locations. In this case, the refresh address sequence may comprise a sequence of row addresses identifying the order in which the rows of memory locations are refreshed. The memory locations may also be refreshed in units of groups (or clusters) of locations, with the refresh address sequence identifying the order in which the groups (or clusters) are refreshed. Hence, it is not essential for the refresh address sequence to identify every memory location of the DRAM individually. Randomizing the order in which rows or groups of memory locations are refreshed, with each memory location within the same row or group being refreshed at the same time, is enough to make a DPA attack difficult.

The refresh address sequence generator may comprise a sequential address sequence generator which generates an address sequence in a sequential order. The refresh address sequence generator may generate the refresh address sequence from the sequential address sequence by randomising the order of the addresses of at least a portion of the memory locations. A sequential address sequence generator is often already provided in a typical DRAM refresh controller, and so can be reused as a starting point for generating the randomized refresh address sequence.

The apparatus may comprise a random number generator for generating at least one random number, and the refresh address sequence generator may randomise the order of the addresses of at least the portion of memory locations in dependence on the at least one random number. For example, the random number generator may be a pseudo random number generator for generating pseudo random numbers based on a seed value.

While it would be possible to retain the same random number for several refresh cycles before moving to a different random number, it is preferable for the random number generator to change the at least one random number after each refresh cycle. This ensures that the order of the addresses within the refresh address sequence changes for each refresh cycle in an unpredictable manner, and so deters potential DPA attacks.

An exclusive or (XOR) gate may be used to randomise the order of the addresses of at least a portion of memory locations by performing a bitwise exclusive or (XOR) operation of the addresses with a first random number generated by the random number generator. For a sequence of N-bit addresses, the same N-bit random number would be XORed with each address in the sequence. The random number would then be changed from refresh cycle to refresh cycle. Since there are $2^N$ different possible values for the random number, there are $2^N$ different ways of ordering the refresh address sequence. For example, for a 32-bit address, $2^{32}=4294967296$ is a large number, and so it is very difficult for a DPA attacker to determine the refresh sequence for a given refresh cycle.

In addition to applying an XOR operation, the refresh address sequence generator may also rearrange the bit positions of the addresses according to a second random number generated by the random number generator. This provides further entropy in the refresh address sequence and so makes it harder for an attacker to determine the order of the sequence. By rearranging the bit positions as well as changing the bit values within the addresses, this will disproportionately inconvenience a DPA attacker because it will strongly affect the row and column addressing occurring within the DRAM, causing the attacker to have to take into account a number of extra factors.

The rearrangement of the bit positions of the addresses and the XOR operation are commutative operations, since the same result is achieved irrespective of which operation is performed. Hence, it does not matter whether the rearrangement of bit positions is performed before or after the XOR operation.

The bit positions of the addresses can be rearranged in various ways. For example the addresses may be rotated by a number of bit positions specified by the second random number. A shift register may for example be used to rotate the addresses.

Alternatively, a translation matrix may specify a mapping between original bit positions and rearranged bit positions for each possible value of the second random number. For a given value of the second random number, the appropriate entry in the translation matrix can be accessed and used to identify how to map the bits of the original addresses to bits of the refresh addresses.

The bit position rearrangement may also be used in its own right to randomise the order of the refresh address sequence, without performing the XOR operation. However, since bit position rearrangement has no effect on an address comprising all 0 bit values or all 1 bit values, and has little effect on an address with mostly 0 bit values or mostly 1 bit values, it is preferable to perform the XOR operation which can provide randomization for all addresses within the sequence.

The manufacturer of a DRAM typically provides information identifying a recommended refresh period, which represents the maximum recommended period between successive refresh cycles. If a data value is not refreshed within the recommended refresh period, then the data cannot be guaranteed to be accurate.

Hence, normally the DRAM would be controlled to perform a refresh cycle at intervals of the recommended refresh period. However, the present technique recognises that if the ordering of the memory addresses within the refresh address sequence is randomised and refresh cycles are performed at intervals of the recommended refresh period, then it is possible that a particular memory location could be refreshed near the beginning of one refresh cycle and near the end of the next refresh cycle, so that the period between successive refreshes of the same location may be greater than the recommended refresh period. This could lead to data loss.

To address this problem, the refresh control circuitry may control the DRAM to periodically perform the refresh cycle at intervals of half the recommended refresh period. This ensures that any particular location is refreshed within the recommended refresh period, even when the order of the refresh sequence is randomised.

The apparatus may comprise processing circuitry for performing data processing. In some embodiments the DRAM may be an off-chip memory located on a separate chip to the processing circuitry.

However, the present technique is particularly useful when the processing circuitry and DRAM are integrated on the same system-on-chip or in the same package, since this is when the DRAM is most likely to be used for storing secure data, because the interface between the DRAM and the processing circuitry is less accessible to a potential attacker.

The DRAM and processing circuitry may have separate power supply inputs or may share a common power supply input. If the DRAM and processing circuitry have separate power supply inputs then it is preferable that the refresh address sequence is always randomized, since in this case the DRAM's power consumption while performing refresh operations would be distinguishable from the power consumed by the processing circuitry and so a DPA attacker could probe the contents of the DRAM by monitoring the power drawn via the dedicated DRAM power supply input.

On the other hand, if the processing circuitry and the DRAM share a common power supply input, then it is possible that sometimes the power drawn by the processing circuitry may obscure the power consumption profile of the DRAM. In this case, the refresh sequence need not always be randomized.

Therefore, the refresh address sequence generator may be provided with a normal mode and a random mode. In the normal mode, the refresh address sequence may be generated with the addresses in a sequential order, while in the random mode the refresh address sequence may be generated with the addresses of at least a portion of the memory locations in a random order. In the random mode, the refresh cycles may need to be performed more frequently than in the normal mode, for the reasons explained above. Therefore, more power is consumed, and there may be an impact on processing performance because more DRAM bandwidth is required for refresh operations which could delay DRAM accesses from the processor. Hence, by providing a normal mode and a random mode, this allows the user to trade off increased security of the random mode against reduced power consumption and increased performance of the normal mode, depending on the particular requirements of the user.

The processing circuitry may have a normal mode and a power saving mode. During the normal mode, the power drawn by the processing circuitry may be enough to prevent the DRAM activity being identifiable by DPA. However, during the power saving mode, the processing circuitry may consume very little power itself, and so at this time the power drawn via the shared power input is mainly caused by the refresh operation of the DRAM. This means that the DRAM is more vulnerable to DPA attacks while the processing circuitry is in the power saving mode than while the processing circuitry is in the normal mode. Therefore, the refresh address sequence generator may be configured to operate in the normal mode while the processing circuitry is operating in the normal mode, and operate in the random mode while the processing circuitry is operating in the power saving mode.

Alternatively, or in addition to this control, the refresh control circuitry may also detect DRAM accesses to the DRAM by the processing circuitry. When the volume of DRAM accesses is relatively high, then the power consumed by the processing circuitry and DRAM as a whole may be influenced by a number of factors other than the refresh operation, and so in this case it may not be necessary to use the random mode. On the other hand, if DRAM accesses become sparse, for example because the processing circuitry is performing operations which involve a memory other than the DRAM, than the DRAM refresh operation may once again become visible within the overall power profile. Hence, the refresh control circuitry may operate in the normal mode if a detected volume of DRAM accesses is greater than a predetermined threshold and operate in the random mode if the detected volume of DRAM accesses is less than the predetermined threshold.

The DRAM may be controlled to perform the refresh cycle twice as frequently when in the random mode as when in the normal mode. This ensures that during the random mode, each DRAM location is refreshed within the recommended refresh period, while during the normal mode power consumption can be reduced and processing performance improved by performing the refresh cycles less frequently.

In some embodiments, the randomized refresh address sequence may be used for all memory locations of the DRAM. While it is unlikely that all memory locations of the DRAM would be storing secure data, the greater the number of addresses whose order is randomized, the greater the number of possible orderings of the addresses, and so the greater the amount of entropy which a DPA attacker would have to crack in order to identify the contents of the DRAM locations. Therefore, randomizing the order of addresses of locations storing non-secure data as well as locations storing secure data improves the security of the secure data of the DRAM.

On the other hand, to reduce power consumption it is possible to perform the randomisation using only the addresses of memory locations within a portion of the DRAM, with addresses of memory locations outside that portion remaining in a sequential order. For example, the randomization could be applied only to addresses corresponding to a secure portion of the DRAM for storing secure data, secret data, or confidential data. This technique will typically work best if the secure portion comprises a block of $2^N$ memory locations or memory rows and is aligned to a natural memory address boundary.

The refresh control circuitry and refresh address sequence generator may be implemented in different ways. For example, the apparatus may comprise a memory controller for controlling said DRAM, with the memory controller comprising the refresh control circuitry and the refresh address sequence generator. The memory controller controls when and how refreshing of the DRAM is performed.

Alternatively, the DRAM may comprise the refresh control circuitry and the refresh address sequence generator. In this case, since the DRAM controls its own refresh operations, the DRAM appears to other elements of the apparatus (such as a memory controller) as a static random access memory which does not require refreshing.

Viewed from another aspect, the present invention provides an apparatus comprising:

dynamic random-access memory (DRAM) means for storing data;

refresh control means for controlling said DRAM means to periodically perform a refresh cycle for refreshing the data stored in each memory location of said DRAM means; and refresh address sequence generating means for generating a refresh address sequence of addresses identifying the order in which memory locations of said DRAM means are refreshed during said refresh cycle;

wherein said refresh address sequence generating means generates said refresh address sequence with the addresses for at least a portion of said memory locations in a random order which varies from refresh cycle to refresh cycle.

Viewed from a further aspect, the present invention provides a method comprising steps of:

storing data in a dynamic random-access memory (DRAM);

controlling said DRAM to periodically perform a refresh cycle for refreshing the data stored in each memory location of said DRAM; and generating a refresh address sequence of addresses identifying the order in which memory locations of said DRAM are refreshed during said refresh cycle;

wherein said refresh address sequence is generated with the addresses for at least a portion of said memory locations in a random order which varies from refresh cycle to refresh cycle.

Further particular and preferred aspects of the present invention are set out in the accompanying independent and dependent claims. Features of the dependent claims may be combined with features of the independent claims as appropriate, and in combinations other than those explicitly set out in the claims.

DESCRIPTION OF THE EMBODIMENTS

Figure 1A:
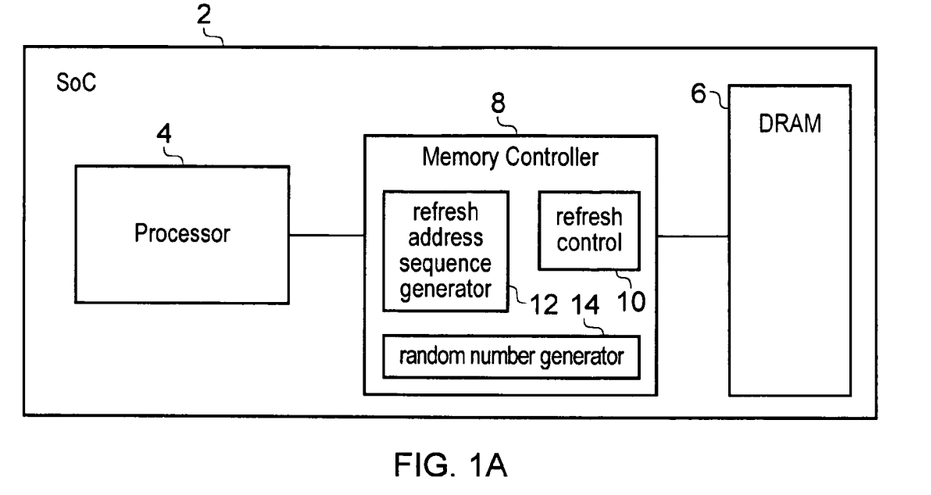
FIGS. 1A and 1B illustrate examples of a system-on-chip comprising a DRAM and a refresh controller for controlling refreshing of the DRAM.

FIG. 1A shows an example of a system-on-chip 2 comprising a processor 4, a dynamic random access memory (DRAM) 6 and a memory controller 8. The DRAM 6 may comprise any kind of memory which requires periodic refreshing, for example dynamic random access memory which stores data using capacitors.

The memory controller 8 is provided for controlling the operation of the DRAM 6. The memory controller 8 comprises a refresh controller 10 for controlling refreshing of the DRAM 6, a refresh address sequence generator 12 for generating a refresh address sequence identifying the order in which memory locations of the DRAM are refreshed during a refresh cycle, and a random number generator 14 for generating random numbers. For example, the random number generator 14 may comprise a pseudo random number generator for generating a sequence of pseudo random numbers based on a seed value.

Figure 1B:
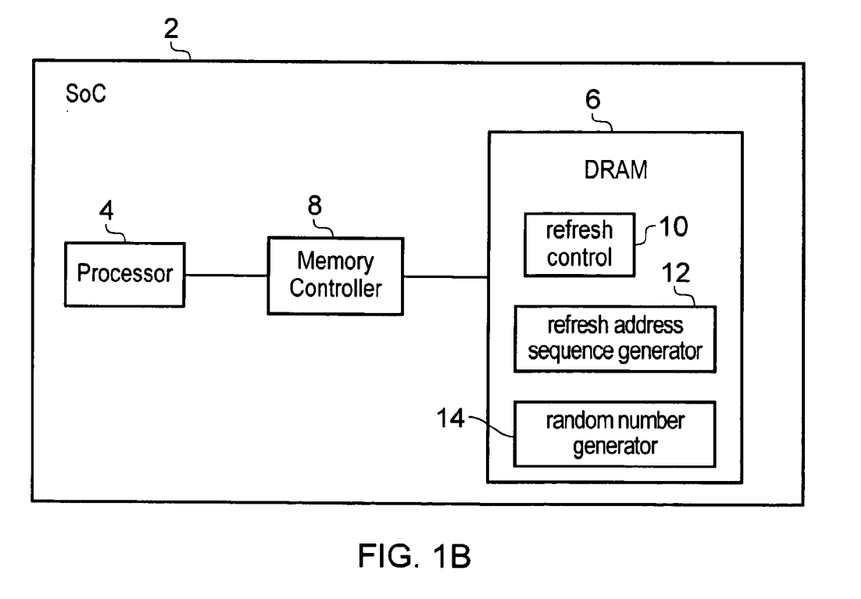

FIG. 1B shows an alternative example of a system-on-chip 2 in which the refresh controller 10, the refresh address sequence address generator 12 and the random number generator 14 are provided within the DRAM package 6. From the point of view of the memory controller 8, the DRAM 6 of FIG. 1B acts as a static random access memory since the memory controller 8 does not need to consider the refreshing of the DRAM 6.

While FIGS. 1A and 1B show the DRAM 6 integrated into the same system-on-chip 2 as the processor 4, in other embodiments the DRAM 6 may be an off-chip memory.

In both of the embodiments of FIGS. 1A and 1B, the refresh controller 10 controls the DRAM 6 to periodically perform a refresh cycle in which each memory location of the DRAM is refreshed. For example, the memory locations of the DRAM may be refreshed a row at a time by reading the values from a row of memory locations, rewriting the row of memory locations with the data which has been read, and then repeating this operation for each subsequent row. Alternatively, the refresh operation may be performed in units of memory locations other than a row.

The refresh address sequence generator 12 generates a sequence of addresses identifying in the order in which the memory locations (or rows of memory locations) are refreshed. To deter differential power analysis attacks, the order of at least a portion of the memory addresses is randomised based on a random number generated by the random number generator 14. This means that the temporal order in which the locations of the DRAM 6 are refreshed is randomised, although the physical location at which each item of data is stored remains the same.

Figure 2:
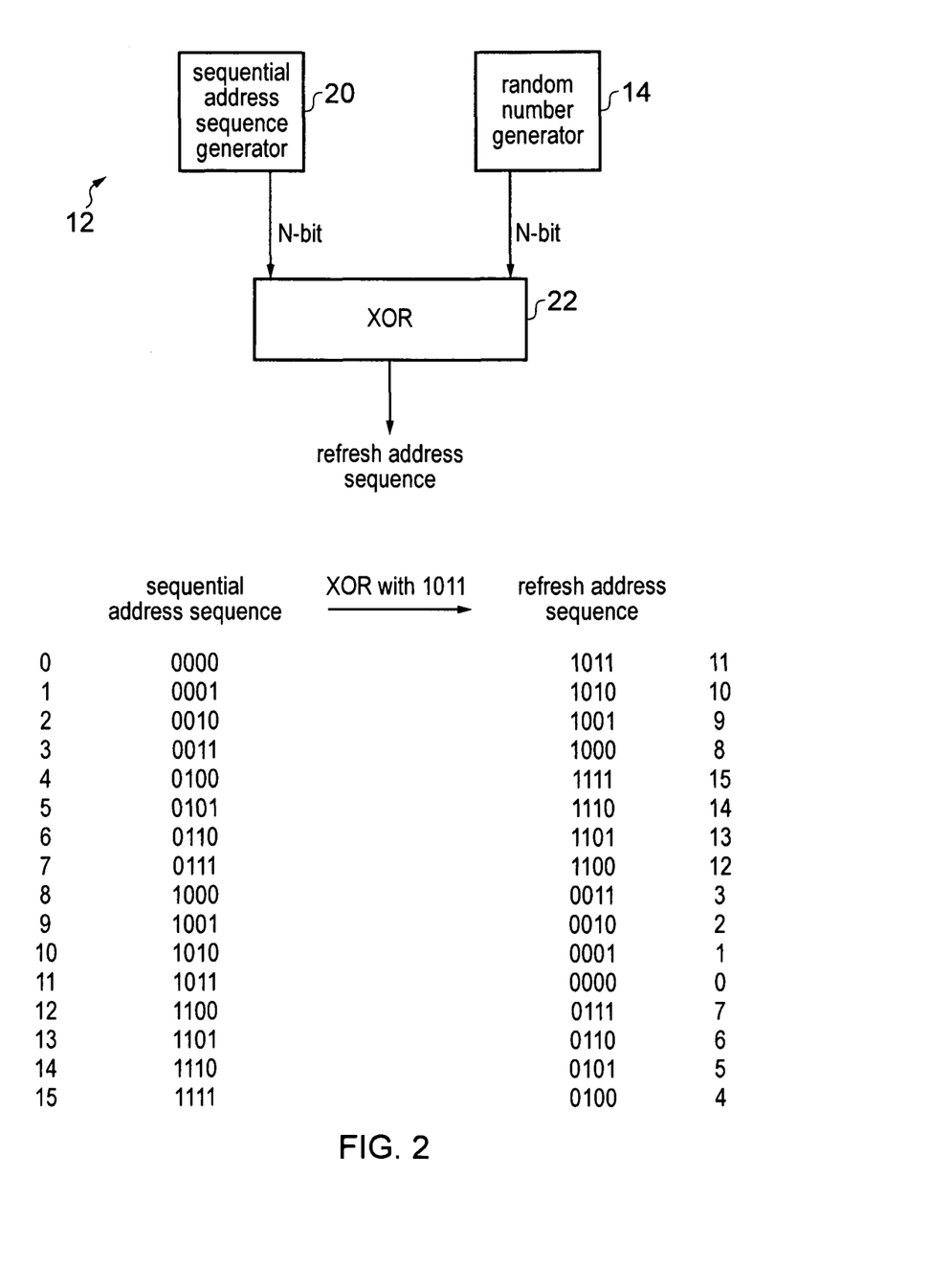
FIG. 2 illustrates an example of randomising the order of a refresh address sequence.

FIG. 2 shows an example of how the address sequence can be randomised. The refresh address sequence generator 12 includes a sequential address sequence generator 20 which generates a sequence of addresses in a sequential order. The random number generator 14 generates a random number having the same number of bits as the addresses generated by the sequential address sequence generator 20. An XOR gate 22 is provided to XOR the addresses generated by the sequential address sequence generator 20 with the random number generated by the random number generator 14, to generate the refresh address sequence.

The XOR operation has the property that when the same N-bit number is XORed with each value in a sequence of $2^N$ N-bit values comprising each possible permutation of 1s and 0s, the result is a sequence comprising all the original values but in a different order. This means that the XOR operation is useful for randomizing the order of the address sequence.

This is demonstrated in FIG. 2, which shows an example using 4-bit addresses. Each address in the sequence is combined with a 4-bit random number 1011 using the bitwise exclusive OR (XOR) operation. As shown in FIG. 2, each value within the sequential address sequence also appears in the randomized refresh address sequence, but in a different order dependent on the value of the random number.

Hence, by using the same random number for one refresh cycle and then changing the random number for the next refresh cycle, the random number generator 14 can control the refresh address sequence generator 12 so that the next refresh cycle is performed with a different randomised sequence of addresses. While preferably the random number is changed after each refresh cycle to maximise security, it is possible for the random number to be changed less often, for example after two or more refresh cycles using the same random number.

Since typically the addresses in the sequence will have a reasonably large number of bits (for example, 16, 32 or 64 bits), and the random number has the same number of bits as the addresses, then there are many possible orderings for the refresh address sequence. For example, for a 32 bit address, there are $2^{32}=4294967296$ permutations, which is a very large number. Therefore, randomising the sequence of the address in this way makes it very difficult for information to be derived from the refresh activity by differential power analysis.

While applying an XOR operation to addresses varies the order in which the addresses appear in the sequence, the XOR operation does not change the frequency with which the bit value at each bit position of the address switches states during the refresh cycle. For example, as can be seen in FIG. 2, the most significant bit still only changes twice per refresh cycle (once from 0 to 1 and once from 1 to 0). This may be able to provide the DPA attacker with additional information which can be used to improve the likelihood of success of a brute force attack. For example, the attacker may be able to determine whether an address is refreshed in the first half or the second half of the address sequence.

Figure 3:
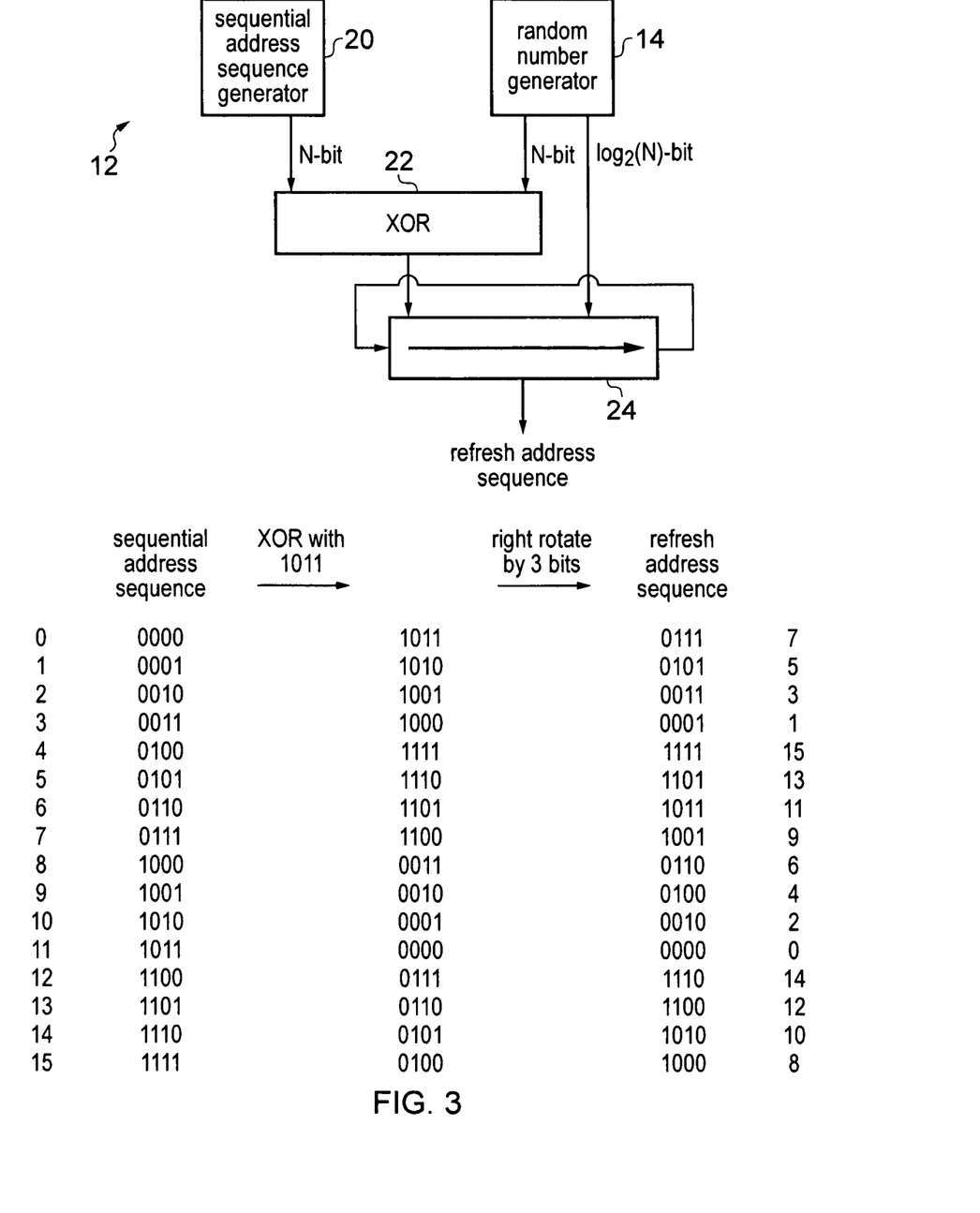
FIG. 3 illustrates another example of randomising the order of the refresh address sequence.

To prevent this, in the example shown in FIG. 3, an additional rearrangement of the bit positions of the addresses is performed. FIG. 3 shows a shift register 24 which rotates the bits of the addresses generated by XOR gate 22 by a number of bit positions specified by a second random number generated by the random number generator 14. The address bits which are shifted out of one side of the shift register 24 are inserted into the other side of the shift register 24. Again, the second random number would preferably be changed after each refresh cycle. For an N-bit address, the second random number has $\log_2(N)$ bits.

In the example of FIG. 3, after XORing the addresses of the sequential address sequence with a random number 1011, the addresses are right rotated by 3 bit positions to generate the refresh address sequence used for the refresh cycle. In the final refresh address sequence, the frequency with which each bit position switches states is changed so that in this example it is the least significant bit that only changes twice per cycle, with the most significant bit changing state four times per cycle. This makes it harder for an attacker to derive information which could be used to identify the secure contents of the DRAM.

While FIG. 3 shows the bit rotation being applied after the XOR operation, it will be appreciated that the rotation may also be applied before the XOR operation. Also, while FIG. 3 illustrates a right rotate, a left rotate may also be used.

Figure 4:
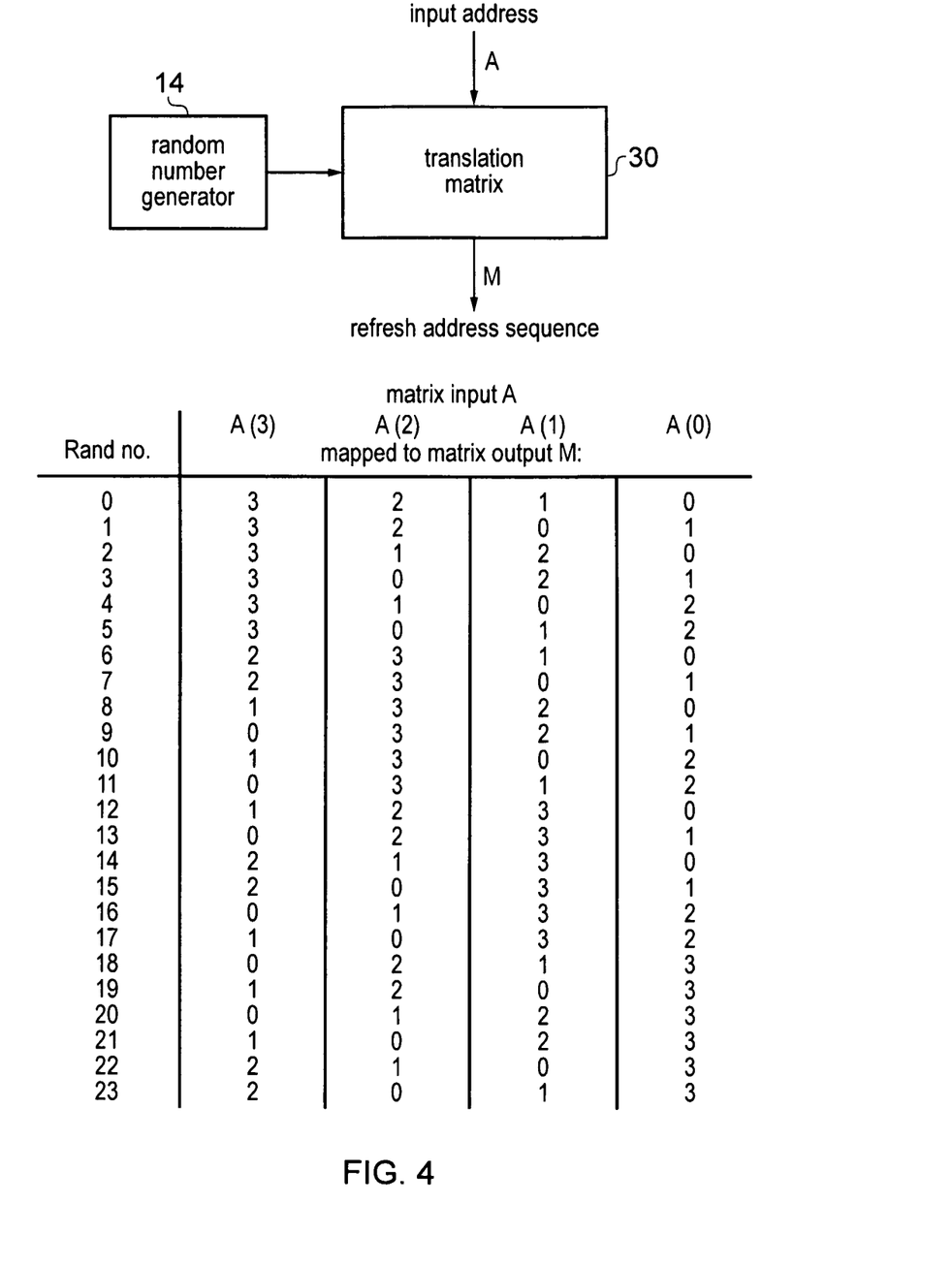
FIG. 4 illustrates an example of a translation matrix for rearranging the bit positions of addresses.

FIG. 4 shows an alternative way of rearranging the positions of the bits within the addresses using a translation matrix 30, which may be used in place of the shift register 24 shown in FIG. 3. The translation matrix 30 specifies mappings between bit positions of the input address A and bit positions of an output address M for each possible value of the random number generated by the random number generator 14. Hence, for a given refresh cycle, the bit positions of each address in the refresh address sequence are rearranged according to the mapping specified by the current random number. A new random number is then selected for the next refresh cycle to provide a different mapping.

For example, for a 4-bit address there are 24 different possible mappings, which can be mapped to 24 different values of the random number, for instance using the mapping shown in FIG. 4. For example, in FIG. 4 a random number of 7 causes bits 3, 2, 1 and 0 of each input address A in the refresh sequence to be mapped to bits 2, 3, 0 and 1 of each output address M.

As in FIG. 3, the bit position rearrangement using the matrix 30 of FIG. 4 may be performed either before or after applying an XOR operation to the addresses. Rearranging the bit positions of the addresses as shown in FIGS. 3 and 4 will vary the activity on a particular address line between cycles. For example, on a 64-bit address bus, the $63^{rd}$ bit line would normally change bit value twice per refresh cycle (once from 0 to 1 and once from 1 to 0), but by rearranging the bit positions of the addresses in a random way, the value of the $63^{rd}$ bit line may now toggle anywhere between once per refresh cycle and $2^{63}$ times per cycle depending on the rearrangement applied during that refresh cycle). This will disproportionately inconvenience an attacker because it will strongly affect the row/column addressing occurring inside the DRAM and so cause a number of additional power factors to be taken into account when performing DPA.

The bit rotation shown in FIG. 3 or the translation matrix shown in FIG. 4 could also be used on its own to perform randomisation of the refresh address sequence, without performing an XOR operation as well. However, this is less preferred, because unlike the XOR operation, the bit position rearrangement operations of FIGS. 3 and 4 can only rearrange the existing bit values of the addresses, and cannot change the actual bit values. This means that, for example, address values 0b0000 . . . or 0b1111 . . . , comprising all 0 or 1 bit values, could not be randomized using the bit position rearrangement alone, which could allow a DPA attacker to determine the contents of the locations having address 0b0000 . . . or 0b1111 . . . . Therefore, it is more secure to use the bit position rearrangement in combination with the XOR operation.

It can be useful to perform the randomised refresh at twice the rate recommended by a manufacturer of the DRAM. Typically, the DRAM manufacturer will indicate a recommended refresh period for a given DRAM device which represents the maximum time that a particular memory location should remain unrefreshed. If a memory location is not refreshed within the recommended refresh period, then the data cannot be guaranteed to be accurate and, in a worst case scenario, would be lost. Therefore, it is typical for DRAM refresh cycles to be performed at intervals of the recommended refresh period R, as shown in part A of FIG. 5. However, if the randomised refresh scheme is used then it is possible that a memory location identified by a particular address X may be refreshed right at the beginning of one refresh cycle and refreshed right at the end of the following refresh cycle. As shown in part A of FIG. 5, this means that the period between successive refreshes of the same location can be greater than the recommended refresh period R, which could lead to loss of data.

Figure 5:
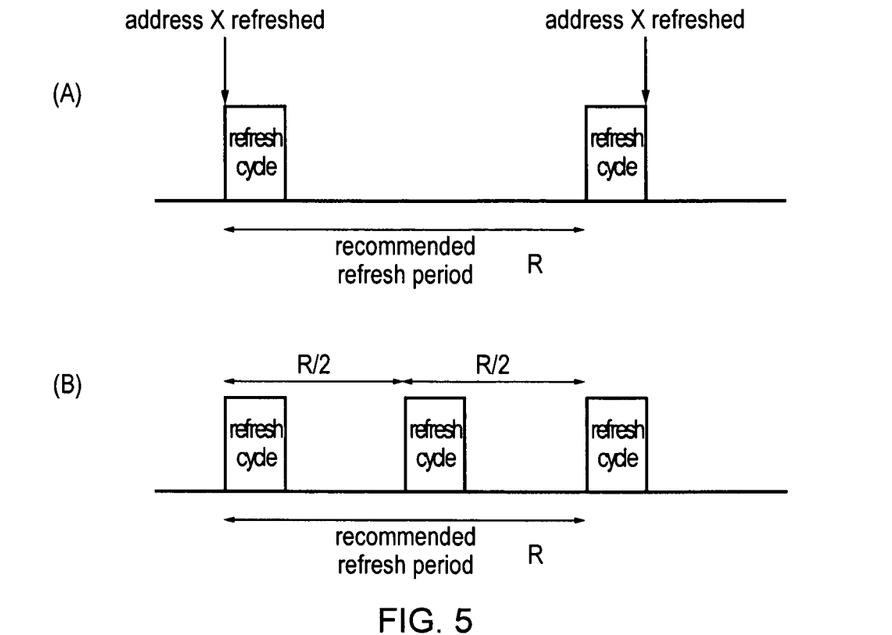
FIG. 5 illustrates an example showing why refresh cycles are performed at twice the recommended rate when the randomised refresh scheme is used.

To address this problem, the refresh cycles may be performed at intervals of half the recommended refresh period R as shown in part B of FIG. 5. This ensures that even if an address occurs at the beginning of the refresh sequence in one refresh cycle and at the end of the refresh sequence in the next refresh cycle, the memory location associated with that address is still refreshed within the recommended refresh period.

Figure 6:
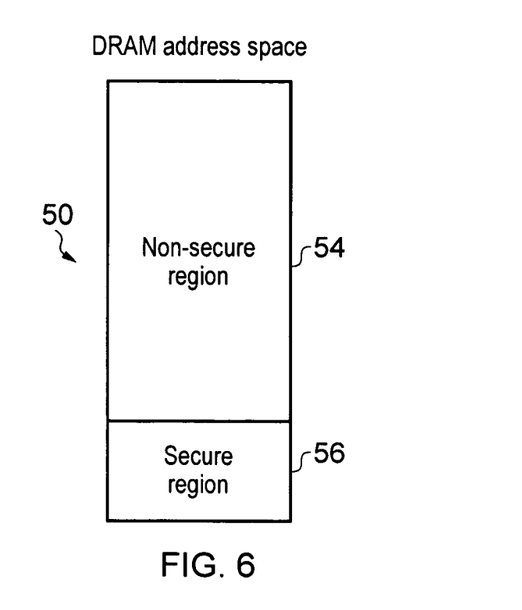
FIG. 6 illustrates an example of a DRAM address space having a non-secure region and a secure region.

FIG. 6 shows a DRAM address space 50 comprising a non-secure region 54 and a secure region 56. The secure region 56 is provided specifically for storing secure programs and secure data. The non-secure region 54 is provided for storing other data. In other examples, the address space 50 may contain multiple secure regions 56 or non-secure regions 54.

The randomised refresh address sequence described above may be applied to either the entire DRAM address space 50 or only to portions of the address space. For example, the randomised scheme may be used just for the secure region 56, and the addresses of the non-secure region 54 may be refreshed in sequence. By performing randomised refresh only for the secure region 56, power consumption can be reduced. On the other hand, by randomizing the addresses of the non-secure region 54 as well as the addresses of the secure region, there are a greater number of possible permutations for ordering the addresses of the refresh address sequence, making it more difficult for the DPA attacker to determine the contents of the secure region 56.

Figure 7:
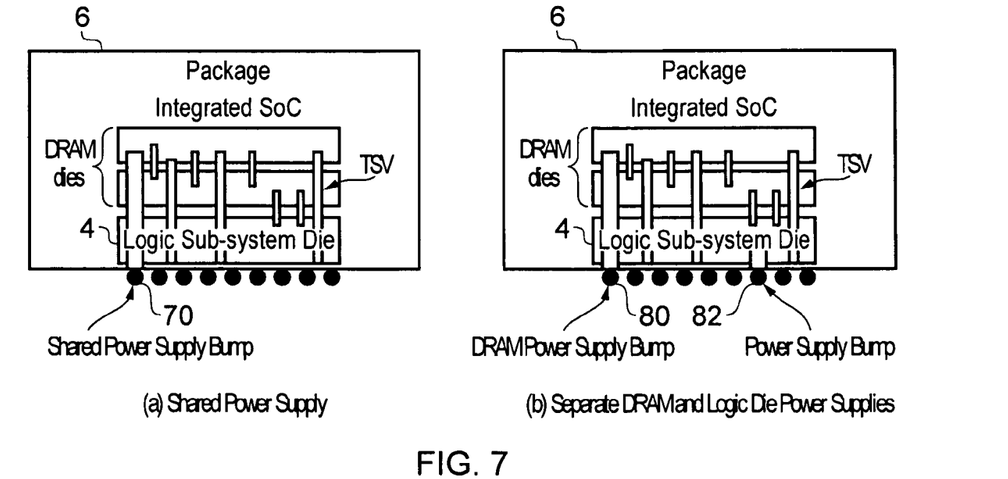
FIG. 7 illustrates examples of an integrated circuit package having DRAM and processing logic which share a power supply input or which have separate power supply inputs.

FIG. 7 shows two example implementations of the apparatus in a package rather than a system-on-chip as shown in FIG. 1. In part (a) of FIG. 7, the separate processing logic 4 and DRAM 6 silicon wafers of the integrated circuit package share a common power supply input. This means that if a DPA attacker probes the power via the shared power supply input 70, then observed power consumption profile will be influenced by contributions of both the logic 4 and the DRAM 6. This may on some occasions be enough to obscure the profile caused by the DRAM refresh, and so it may not always be necessary to randomize the address sequence. Therefore, the random sequence generation may be used selectively.

Figure 8:
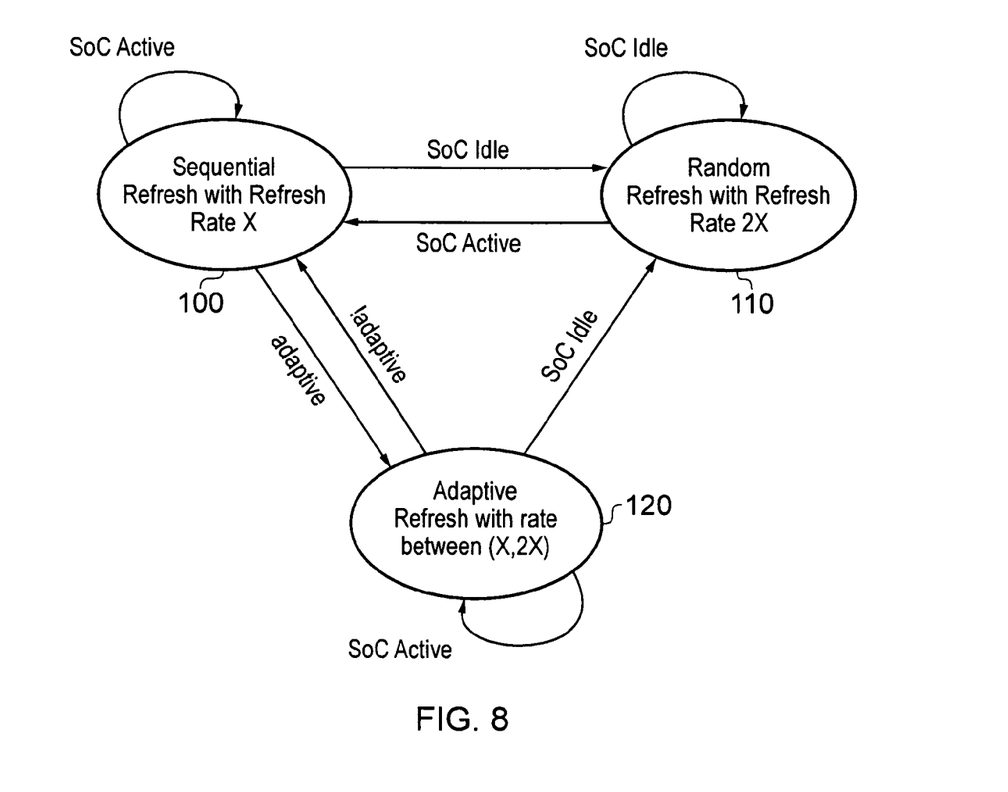
FIG. 8 illustrates a state diagram showing transitions between different modes for performing refreshing of the DRAM.

For instance, FIG. 8 shows an example of a state machine having different refresh modes. In a normal mode 100, the memory locations are refreshed in a sequential order at the recommended refresh rate X. In a random mode 110, at least part of the refresh sequence is randomised using the techniques discussed above, and the refresh cycles are performed at twice the recommended refresh rate (2x).

The random mode 120 provides greater security than the normal mode 100. On the other hand, the normal mode 100 provides reduced power consumption and improved performance relative to the random mode 120. During the random mode 120, refresh cycles are performed twice as frequently as in the normal mode 100, which means that there is less DRAM bandwidth available for the processing circuitry 4 to perform DRAM accesses. This may impact system performance.

An adaptive refresh mode 120 may also be provided in which the refresh controller 10 detects the volume of DRAM accesses to the DRAM 6 by the processing logic 4 and varies the refresh rate (i.e. varies whether the normal mode or the random refresh address generation scheme is used) depending on the volume of DRAM accesses. The volume of DRAM accesses may be monitored for example by counting the number of DRAM accesses in a given period of time. If the volume of DRAM accesses is reasonably high (e.g. higher than a predetermined threshold), then the power signature of DRAM refresh scheme may be largely obscured by the DRAM accesses, and so the randomised refresh address sequence generation scheme may not be necessary. In this case, the sequential address sequence can be used as in the normal mode 100. On the other hand, when DRAM accesses are sparse (e.g. the number of counted accesses is lower than the threshold) then the refresh controller 10 can switch to generating a randomised refresh address sequence as in the random mode 110. Hence, the adaptive mode 120 can provide a half-way house mode whose security, power consumption, and impact on system performance lies between that of the normal mode 100 and random mode 110.

Therefore, the state machine shown in FIG. 8 may allow a trade-off between increased security of the random mode 110 and reduced power consumption and improved performance of the adaptive or normal modes 100, 120. For example, when the apparatus enters a power saving state in which the processing circuitry 4 is placed in a power saving mode, then the refresh controller 10 may switch to the random mode 110. When the processing circuitry 4 becomes active again, then the refresh controller may switch back to either the active mode 100 or the adaptive mode 120 to save power. Alternatively, the user may select which mode to use depending on current security requirements. When a mode switch is required, then the refresh controller 10 waits until the end of the current refresh cycle before switching modes (as switching modes mid-cycle could lead to some locations not being refreshed within the recommended refresh period).

Part (b) of FIG. 7 shows another example of an integrated circuit package, in which separate power supply inputs 80, 82 are provided for the processing logic 4 and DRAM 6 respectively. In this case, the power drawn by the DRAM during the refresh cycle is distinguishable from the power consumed by the processing logic 4 irrespective of whether the processing circuitry 4 is active or whether it is accessing the DRAM regularly. Therefore, in such an embodiment it would usually be preferable for the refresh controller 10 to permanently use the random mode (unless for some reason the increased security of the random mode is not considered necessary, in which case the normal mode could be used).

The state machine of FIG. 8 may be used with both the system-on-chip implementation of FIG. 1 and the integrated circuit package implementation of FIG. 7.

Figure 9:
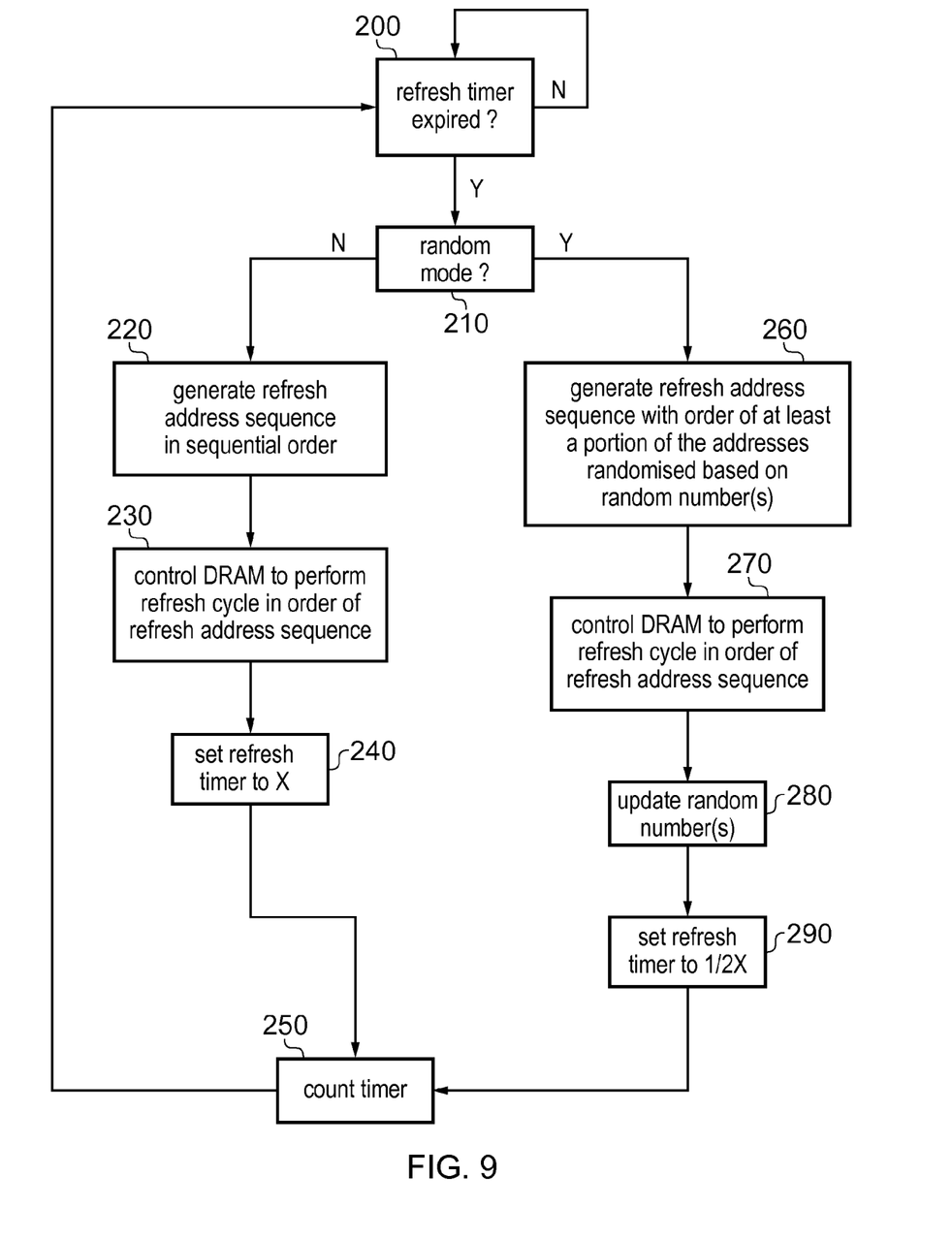
FIG. 9 illustrates a method of controlling refresh operations in a DRAM.

FIG. 9 shows a method of controlling refresh cycles of a DRAM. The refresh controller 10 may have a refresh timer which is used to identify the times at which refreshing is to be performed. After a refresh cycle is performed, the refresh timer is set to a value representing a given amount of time. The timer then counts down until the specified time has elapsed, at which point the next refresh cycle is performed. Hence, at step 200, the refresh controller 10 detects whether the refresh timer has expired. Once the refresh timer has expired then at step 210 the refresh controller 10 determines whether it is currently in the random mode or the normal mode. If the refresh controller 10 is in the adaptive mode 120 of FIG. 8 then the refresh controller 10 determines based on the observed volume of DRAM activity whether to use the random mode 110 or the normal mode 100.

If the refresh controller 10 is in the normal mode (or the adaptive mode currently does not require randomization to be applied), then at step 220 the refresh controller 10 controls the refresh address sequence generator 12 to generate the refresh address sequence in a sequential order. Hence, no randomisation is applied. At step 230, the refresh controller 10 controls the DRAM 6 to perform the refresh cycle in the order identified by the generated refresh address sequence. At step 240, the refresh controller 10 sets the refresh timer to a value X representing the recommended refresh period. Then at step 250 the refresh controller 10 counts down the timer and the method returns to step 200 until the refresh timer expires once more.

On the other hand, if at step 210 the refresh controller is in the random mode (or the adaptive mode currently requires the refresh sequence to be randomized) then at step 260 the refresh controller 10 controls the refresh address sequence generator 12 to generate a refresh address sequence with the order of at least a portion of the addresses of the DRAM randomised based on the random numbers generated by the random number generator 14. At step 270, the refresh controller 10 controls DRAM 6 to perform the refresh cycle with the memory locations of the DRAM 6 refreshed in the order identified by the randomised refresh address sequence. Then at step 280 the random number generator 14 updates its random numbers so that the next time a randomised refresh address sequence is generated, the addresses will be in a different order. At step 290, the refresh timer is set to a value of X/2 representing half the recommended refresh period. The method then returns to step 250 where the timer once more counts down until it expires at step 200. By setting the timer to a value of X/2 when the random mode is being used, the next refresh will occur after half the recommended period to ensure that even if a particular address is refreshed at the beginning of one cycle and at the end of the next cycle, the address will still be refreshed within the recommended period.

The DRAM 6 shown in FIGS. 1A, 1B and 7 may comprise a single memory unit or multiple physically distinct memory units. If there are multiple memory units, then the refreshing of the memory units may be controlled by a shared refresh controller 10 and refresh address sequence generator 12, so that a refresh cycle is performed over the whole DRAM address space encompassing multiple memory units. This would tend to increase the amount of randomness in the ordering of the refresh address sequence.

On the other hand, it is also possible to provide each memory unit of the DRAM 6 with its own dedicated refresh controller 10 and refresh address sequence generator 12, with the refresh cycle of one memory unit managed independently of the refresh cycle of another memory unit.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   a dynamic random-access memory (DRAM) for storing data;
   refresh control circuitry configured to control said DRAM to periodically perform a refresh cycle for refreshing the data stored in each memory location of said DRAM; and
   a refresh address sequence generator configured to generate a refresh address sequence of addresses identifying the order in which memory locations of said DRAM are refreshed during said refresh cycle;
   wherein said refresh address sequence generator is configured to generate said refresh address sequence with the addresses of at least a portion of said memory locations in a random order which varies from refresh cycle to refresh cycle;
   wherein said refresh address sequence generator has a normal mode in which said refresh address sequence is generated with said addresses of said at least a portion of said memory in a sequential order, and a random mode in which said refresh address sequence is generated with said addresses of said at least a portion of said memory locations in said random order; and wherein said refresh address sequence generator is configured to operate in said normal mode when processing circuitry configured to perform data processing is operating in a normal mode and to operate in said random mode when said processing circuitry is operating in a power saving mode; or wherein said refresh control circuitry is configured to detect accesses to said DRAM by said processing circuitry and said refresh address sequence generator is configured to operate in said normal mode when a detected volume of accesses is greater than a predetermined threshold and to operate in said random mode when said detected volume of accesses is less than said predetermined threshold.

2. The apparatus according to claim 1, wherein said refresh address sequence generator comprises a sequential address sequence generator configured to generate a sequential address sequence of addresses in a sequential order; and said refresh address sequence generator is configured to generate said refresh address sequence from said sequential address sequence by randomizing the order of said addresses of said at least a portion of said memory locations.

3. The apparatus according to claim 1, comprising a random number generator configured to generate at least one random number, wherein said refresh address sequence generator is configured to randomize the order of said addresses of said at least a portion of said memory locations in dependence on said at least one random number.

4. The apparatus according to claim 3, wherein said random number generator is configured to change said at least one random number after each refresh cycle.

5. The apparatus according to claim 3, wherein said refresh address sequence generator comprises an exclusive or (XOR) gate configured to randomize the order of said addresses of said at least a portion of said memory locations by XORing said addresses with a first random number generated by said random number generator.

6. The apparatus according to claim 5, wherein said refresh address sequence generator is configured to rearrange the bit positions of said addresses of said at least a portion of said memory locations according to a second random number generated by said random number generator.

7. The apparatus according to claim 6, wherein said refresh address sequence generator is configured to rearrange said bit positions of said refresh address sequence of addresses by rotating said addresses by a number of bit positions specified by said second random number.

8. The apparatus according to claim 6, wherein said refresh sequence generator is configured to rearrange said bit positions of said refresh address sequence of addresses using a translation matrix specifying a mapping between original bit positions and rearranged bit positions for each possible value of said second random number.

9. The apparatus according to claim 1, wherein said DRAM has a recommended refresh period representing a maximum recommended period between successive refresh cycles, and said refresh control circuitry is configured to control said DRAM to periodically perform said refresh cycle at intervals of half said recommended refresh period.

10. The apparatus according to claim 1, comprising processing circuitry configured to perform data processing.

11. The apparatus according to claim 10, wherein said processing circuitry and said DRAM are integrated on the same system-on-chip or the same package.

12. The apparatus according to claim 10, wherein said DRAM and said processing circuitry have separate power supply inputs.

13. The apparatus according to claim 10, wherein said processing circuitry and said DRAM share a common power supply input.

14. The apparatus according to claim 10, wherein when said refresh address sequence generator is operating in said random mode, said refresh control circuitry is configured to control said DRAM to perform said refresh cycle twice as frequently as when said refresh address sequence generator is operating in said normal mode.

15. The apparatus according to claim 1, wherein said at least a portion of said memory locations comprises all memory locations of said DRAM.

16. The apparatus according to claim 1, wherein said at least a portion of said memory locations comprises memory locations within a secure portion of said DRAM for storing confidential data.

17. A method comprising steps of:
storing data in a dynamic random-access memory (DRAM);
controlling said DRAM to periodically perform a refresh cycle for refreshing the data stored in each memory location of said DRAM; and
generating a refresh address sequence of addresses identifying the order in which memory locations of said DRAM are refreshed during said refresh cycle;
wherein in a random mode said refresh address sequence is generated with the addresses for at least a portion of said memory locations in a random order which varies from refresh cycle to refresh cycle, and in a normal mode said refresh address sequence is generated with said addresses of said at least a portion of said memory means in a sequential order; and
when processing circuitry configured to perform data processing is operating in a normal mode, said refresh address sequence is generated in said normal mode, and when the processing circuitry is operating in a power saving mode, said refresh address sequence is generated in said random mode; or
said refresh address sequence is generated in said normal mode when a detected volume of accesses to said DRAM by said processing circuitry is greater than a predetermined threshold and said refresh address sequence is generated in said random mode when said detected volume of accesses is less than said predetermined threshold.

18. The apparatus according to claim 1, wherein the refresh control circuitry is configured to control said DRAM to perform said refresh cycle in response to a specified period of time having elapsed.

19. The apparatus according to claim 1, wherein the refresh control circuitry is configured to refresh the data stored in each memory location of said DRAM by reading a data value from the memory location and rewriting the memory location with the data value which has been read.

20. An apparatus comprising:
dynamic random access memory (DRAM) means for storing data;
refresh control means for controlling said DRAM means to periodically perform a refresh cycle for refreshing the data stored in each memory location of said DRAM means; and
refresh address sequence generating means for generating a refresh address sequence of addresses identifying the order in which memory locations of said DRAM means are refreshed during said refresh cycle;

wherein said refresh address sequence generating means generates said refresh address sequence with the addresses for at least a portion of said memory locations in a random order which varies from refresh cycle to refresh cycle; and wherein said refresh address sequence generating means has a normal mode in which said refresh address sequence is generated with said addresses of said at least a portion of said memory means in a sequential order, and a random mode in which said refresh address sequence is generated with said addresses of said at least a portion of said memory locations in said random order; and said refresh address sequence generator means is configured to operate in said normal mode when processing means for performing data processing is operating in a normal mode, and to operate in said random mode when said processing means is operating in a power saving mode; or said refresh control means is configured to detect accesses to said DRAM means by said processing means, and said refresh address sequence generating means is configured to operate in said normal mode when a detected volume of accesses is greater than a predetermined threshold, and to operate in said random mode when said detected volume of accesses is less than said predetermined threshold.

* * * * *